United States Patent [19]

Warner

[11] Patent Number: 5,026,077
[45] Date of Patent: Jun. 25, 1991

[54] OMNI-DIRECTIONAL ARTICULATED MOUNTING ASSEMBLY FOR SHAFT SEALS

[75] Inventor: Dale J. Warner, Palm Harbor, Fla.

[73] Assignee: Gits Bros. Mfg. Co., Tampa, Fla.

[21] Appl. No.: 482,825

[22] Filed: Feb. 21, 1990

[51] Int. Cl.$^5$ .............................................. F16J 15/34
[52] U.S. Cl. .............................. 277/93 SD; 277/81 R; 277/87; 277/93 R
[58] Field of Search ............... 277/81 R, 85, 87, 93 R, 277/93 SD, 98, 99, 100, 83, 92, 96, 173

[56] References Cited

U.S. PATENT DOCUMENTS

| | | | |
|---|---|---|---|
| 2,362,436 | 11/1944 | Stratford | 277/87 |
| 2,744,774 | 5/1956 | Wist | 277/99 |
| 3,837,658 | 9/1974 | Skinner et al. | 277/85 X |
| 4,434,986 | 3/1984 | Warner | 277/81 R X |
| 4,509,762 | 4/1985 | Garrett | 277/81 |
| 4,586,719 | 5/1986 | Marsi et al. | 277/81 R X |
| 4,639,000 | 1/1987 | Warner | 277/93 SD X |
| 4,722,534 | 2/1988 | Wentworth | 277/93 SD X |
| 4,768,790 | 9/1988 | Netzel et al. | 277/81 R |

Primary Examiner—Thomas B. Will
Assistant Examiner—J. Folker
Attorney, Agent, or Firm—Hill, Van Santen, Steadman & Simpson

[57] ABSTRACT

A seal assembly, for maintaining a seal condition between a housing and a rotary shaft extending from the housing, it accommodates a significant degree of non-orthogonal alignment between the housing and the shaft. The seal assembly includes a rotary seal member affixed to a rotary shaft, and a stationary member surrounding the shaft and including an internal bore having a contact surface. An annular, stationary floating member surrounds the shaft and is exposed in the internal bore. The floating member includes a surface in sealing engagement with the rotary seal member. An annular slip ring is disposed in the internal bore, and in contact with the floating member and the contact surface. The slip ring provides an articulated link between the floating member and the contact surface of the stationary member, by virtue of being radially displaceable along a rear surface of the floating member.

20 Claims, 1 Drawing Sheet

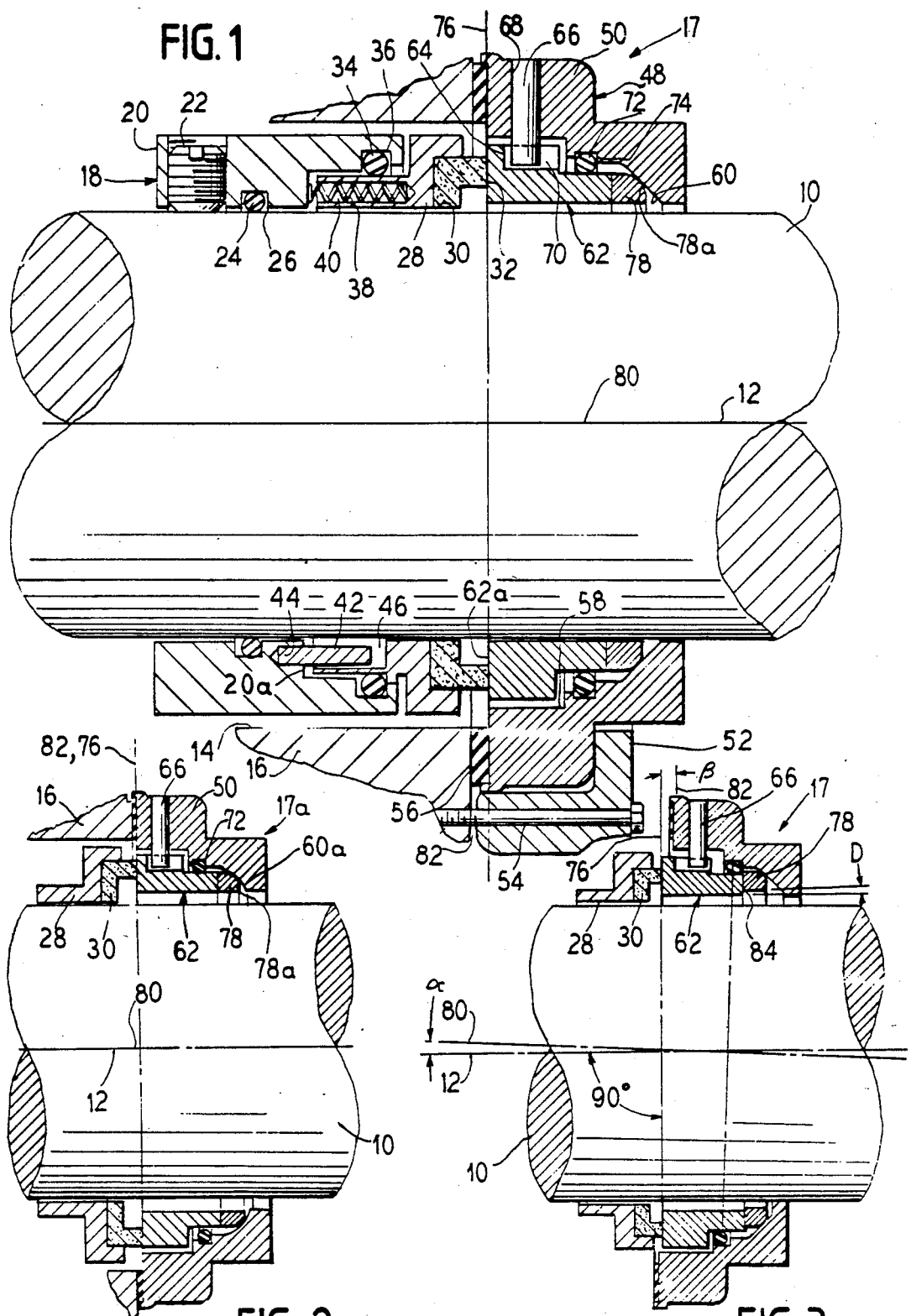

OMNI-DIRECTIONAL ARTICULATED MOUNTING ASSEMBLY FOR SHAFT SEALS

BACKGROUND OF THE INVENTION

1. Field of the Invention

This invention relates generally to self aligning or articulated mounting assemblies for shaft seals to maintain a sealed condition between a seal seating end face of a housing and a rotary shaft extending from the housing generally normal to said end face. Specifically, the invention relates to face-type shaft seals that will accommodate non-orthogonal alignment between the seal seating face of a housing and the axis of a shaft projecting from the housing.

2. Description of Related Art

In seals of the type used in devices including a rotary shaft extending from an opening in a generally planar end wall of a housing which provides a radial seating face for the seal, it is desirable to maintain the axis of the shaft normal or orthogonally to a radial seating face of the housing to maintain full sealing contact between relatively rotating seal rings of the seal assembly. These seal rings generally include a wearable seal member, such as a carbon seal ring rotating with the shaft and having a radial face sealingly engaging and riding on an opposed radial face of a stationary seal ring in a casing or housing mounted on the shaft housing. Thus, the rotating and stationary seal members are inherently maintained in sealing engagement in a plane normal to the axis of the shaft.

However, in installations where the shaft is not orthogonal to the housing, as is often the case with adjustable pumps, and where the shaft or shaft bearings are worn, the sealing face of the stationary seal member may assume a different angularly offset plane. Such offsets cause uneven pressure at the sealing faces creating premature failure of the seal.

My U.S. Pat. No. 4,639,000 issued Jan. 20, 1987 discloses a seal assembly which will accommodate some nonorthogonal misalignment of the shaft and seating face of the housing by providing relatively tiltable engaging surfaces between the stationary seal ring or member and its surrounding casing or housing. However, in this seal the stationary seal ring abuts the casing, and thus limits the tilting.

In addition to this limitation in accommodating only slight misalignments, significant forces are required to effect the tilting, and the parts must be manufactured to relatively close tolerances.

It would therefore be an improvement in this art to substantially increase the tilting capacity, decrease the required tilting forces and increase the tolerance limits of the seal disclosed in my aforesaid U.S. Pat. No. 4,639,000.

SUMMARY OF THE INVENTION

This invention now provides a separate floating slip ring between the stationary seal ring or its carrier and the surrounding housing or casing of a mechanical shaft seal. This separate floating slip ring slides on the end face of the stationary seal member and accommodates tilting on the surrounding housing or casing. The surrounding housing may have a conical or rounded seating face or internal abutment for the floating slip ring providing line or surface engagement therewith. The mating faces of the separate floating slip ring and the stationary seal member are planar and accommodate radial displacement of the floating slip ring relative to the stationary seal member.

In an exemplary embodiment, the seal assembly of the present invention includes a rotary seal member affixed to a rotary shaft, and a stationary seal member surrounding the shaft and including an internal bore having a contact surface. An annular, stationary floating member surrounds the shaft and is disposed in the internal bore. The floating member includes a surface in sealing engagement with the rotary seal member. The floating tilt-accommodating slip ring of the invention is disposed in the internal bore, and in contact with the floating member and the contact surface. This configuration accommodates significant non-orthogonal alignment between the housing and the shaft, while permitting sealing engagement between the rotating and stationary seal surfaces in a plane transverse to the shaft.

The internal bore of the stationary member may be configured as a step bore, in which case the floating member may have a stepped outer surface corresponding to the configuration of the stepped bore. An O-ring may be provided between the internal bore and the floating member to affect sealing engagement therebetween.

The seal assembly may also include devices to prevent the rotation of the floating member within the internal bore. In an exemplary embodiment, this structure includes a plurality of recesses formed in an outer surface of the floating member, and a plurality of anti-rotation lugs, each of which extends through the stationary member and into a cooperating recess in the floating member.

BRIEF DESCRIPTION OF THE DRAWINGS

FIG. 1 is a longitudinal, sectional view of a shaft seal embodying the present invention and showing how it is mounted on a housing and surrounds a shaft projecting from the housing.

FIG. 2 is a view similar to FIG. 1 but showing an alternate form of tilting faces for the floating slip ring and stationary seal housing.

FIG. 3 shows the shaft seal of FIG. 1 with components displaced to accommodate non-orthogonal displacement of the shaft axis relative to the seal seating face of the housing.

DESCRIPTION OF THE PREFERRED EMBODIMENTS

In FIG. 1 there is illustrated a shaft housing combination with a seal assembly of this invention maintaining a sealed condition between the shaft and housing while accommodating rotation of the shaft. As shown, a shaft 10 rotating about an axis 12 extends through an opening 14 in a housing wall 16 surrounding the shaft. A seal assembly 17 of this invention maintains a sealed condition between the shaft and the housing wall 16 surrounding the opening 14.

The seal assembly includes a rotary seal ring 18 having a sleeve 20 surrounding the shaft 12 and secured thereto by circumferentially spaced set screws 22 (only one shown) threaded through the sleeve and biting into the shaft. This sleeve 20 is sealed to the shaft 10 by an O-ring 24 disposed in an internal annular groove 26 in the sleeve. A seal adapter ring 28 has a reduced diameter portion telescoped into a recess in the sleeve 20. A seal ring 30, preferably composed of wear resisting carbon, steel or the like is mounted on the end of the adapter or carrier 28 and secured thereto for co-rotation therewith. This seal ring 30 has a radial end sealing face 32 projecting beyond the adapter 28.

An O-ring 34 seated in an internal annular groove 36 of the sleeve 30 sealingly connects the adapter 28 with the sleeve 20 while accommodating relative axial movement therebetween.

The adapter ring 28 is biased outwardly from the sleeve 20 to press the seal ring 30 into sealing position by a plurality of circumferentially spaced coil springs 38 (only one shown) disposed in blind bores 40 of the adapter 28.

The sleeve 20 and the adapter ring 28 are connected for co-rotation without interfering with relative axial movement therebetween by a plurality of circumferentially spaced drive pins 42 press fitted in circumferentially spaced bores 44 (only one shown) in the radial shoulder 20a at the inner end of the recessed portion of the sleeve 20. These drive pins 42 fit freely in longitudinal internal groove 46 in the adapter ring 28.

Thus, the rotary seal assembly 18 has a seal ring 20 surrounding the shaft 10, secured for co-rotation with the shaft by set screws 22, sealed to the shaft by an internal O-ring 24 and telescopically mounting a seal adapter ring carrying a seal ring spring biased into sealing position, sealed to the sleeve by an internal O-ring, and driven by the sleeve through drive pins.

The seal assembly 17 also has a stationary seal portion 48 with a housing ring or casing 50 secured to the end face of the housing 16 by a surrounding gland 52. The gland 52 is affixed to the end face of the housing by circumferentially spaced screws 54 (only one shown). A gasket 56 is preferably sandwiched between the housing ring 50 and the end face of the housing 16 to sealingly secure the housing ring 50 on the housing 16.

The housing ring 50 has a stepped bore 58 with a tapered contact surface 60 at one end thereof. In the embodiment of FIG. 1, this tapered surface is frustoconical while in the embodiment of FIG. 2 the contact surface 60a is part-spherical.

The stationary seal assembly 48 includes a floating stationary seal ring 62 with an outer periphery 64 contoured to fit freely in the stepped bore 58 of the housing ring 50. This floating stationary seal ring 62 is secured against rotation relative to the housing ring 50 by radial pins or lugs 66 (only one shown) pressed in bores 68 and projecting into the cooperating slots 70 in the outer periphery 64 of the floating seal ring 62.

An O-ring 72 seated in an internal groove 74 in the stepped bore 58 of the housing ring 50 sealingly connects the floating ring 62 with the housing but accommodates floating of the ring 62 in the housing. The floating seal ring 62 has a hardened radial end face 62a sealingly engaging the radial end face 32 of the rotating seal ring 30 carried by the adapter sleeve 28.

Sealing engagement between the seal face of the rotating seal ring 30 and the hardened end face 62a of the stationary seal ring 62 ideally occurs in a seal plane 76 extending normal or transversely to the axis 12 of the rotary shaft. To maintain this transverse relationship despite nonorthogonal misalignments between the rotary shaft 10 and the housing wall 16, this invention provides a separate slip ring 78 in the stepped bore 58 of the housing 50 between the stationary floating seal member 62 and the tapered contact surface 60 or the part-spherical contact surface 60a of the housing ring 50. This slip ring 78 provides an articulated link between the floating seal ring 62 and the housing ring 50.

Interaction of the floating member 62, the stationary member 50, and the slip ring 78 can best be seen in FIGS. 1 and 3. In FIG. 1, the axis 12 of the shaft 10 is orthogonal to the housing wall 16. Therefore, the axis 12 is co-extensive with a line 80 which is orthogonal to a plane 82. The plane 82 is parallel to the outer surface of the housing wall 16 and, as shown in FIG. 2 co-extensive with the seal plane 76.

FIG. 3 illustrates the same seal assembly when the shaft 12 has been displaced into non-orthogonal alignment with the housing wall 16. Such displacement causes the slip ring 78 to rock with respect to the contact surface 60, and to slide along a rear surface 84 of the floating member 62, eventually to be displaced a radial distance D. This displacement allows the floating member 62 to maintain even contact with the O-ring 72, while the slip ring 78 remains in contact both with the floating member 62 and the tapered contact surface 60. The slip ring 78 is shown as accommodating an angular displacement $\alpha$ between the shaft axis 12 and the line 80, which corresponds to a displacement $\beta$ between the seal plane 76 and the plane 82.

In the embodiment of FIG. 2, parts identical with those illustrated in FIGS. 1 and 3 are marked with the same reference numerals. In the embodiment 17a, the rounded nose 78a of the slip ring 78 is in rockable engagement with a mating rounded, preferably part-spherical seating face 60a of the housing ring 50 instead of the frustoconical tapered face 60 of the seal embodiment 17. It should be understood that various contours for the engaging faces of the slip ring and housing ring can be used to accommodate rocking movements between the housing ring and the floating seal ring 62 to maintain the radial sealing plane of the cooperating sealing faces 32 and 62a.

Since the slip ring 78 can slide relative to the floating stationary seal ring 62, maintenance of the optimum radial sealing plane can be maintained throughout a very wide angle of displacement of the shaft axis.

From the above descriptions, it should be understood that the separate slip ring interposed between a floating seal ring and its housing is useful in many types of shaft seal arrangements and that the illustrated embodiments of the invention are only exemplary preferred arrangements.

I claim as my invention:

1. A seal assembly adapted to maintain a seal between a housing and a rotary shaft extending from the housing, said seal assembly comprising first and second seal ring assemblies having radial faces in mutual sealing engagement, first means sealingly connecting said first seal ring assembly to the shaft, a seal housing for the second seal ring assembly having an internal contact surface, second means sealingly connecting said second sealing ring assembly to the seal housing, a free floating slip ring outboard from said second means and sealing ring assembly in rockable engagement with said contact surface and in sliding engagement with said second seal ring assembly, said second sealing ring assembly and said slip ring accommodating tilting movement of said shaft in the seal housing to maintain full face-to-face engagement of the sealing faces of the first and second ring assemblies without exposing the slip ring to a leakage path between the housing and shaft.

2. A seal assembly according to claim 1, further wherein said seal housing comprises an internal stepped bore of said seal housing.

3. A seal assembly according to claim 2, further wherein said second seal ring assembly comprises a stepped outer surface corresponding to said stepped bore.

4. A seal assembly according to claim 2, further comprising an annular groove formed in said internal bore of said seal housing, and said second means being an O-ring disposed in said groove and in sealing engagement with said second seal ring assembly.

5. A seal assembly according to claim 4, further comprising a gasket disposed between said housing and said seal housing and providing a fluid-tight seal therebetween.

6. A seal assembly according to claim 1, further comprising anti-rotation means for securing said second ring assembly against rotation within said seal housing.

7. A seal assembly according to claim 6, further wherein said anti-rotation means comprises a plurality of recesses formed in an outer surface of said second seal ring assembly, and a plurality of anti-rotation lugs, each of said lugs extending through said seal housing and into a respective one of said recesses in said second seal ring assembly.

8. A shaft seal for sealing an opening in a housing through which a rotary shaft extends, said shaft seal comprising a first seal ring assembly sized for surrounding said shaft, means for securing said first ring assembly to the shaft for co-rotation therewith, means for sealing said first ring assembly to said shaft, a seal ring carrier telescopically mounted in said first seal ring assembly, an elastomeric seal ring sealingly connecting the first seal ring assembly and said carrier accommodating relative sliding and tilting movements therebetween, a seal ring mounted in said carrier and having a radial seal face projecting outwardly of said carrier, a second seal ring assembly including a seal ring having a radial end face, spring means for urging the seal ring of the first seal ring assembly into face-to-face sealing engagement with the seal ring of the second seal ring assembly, a seal housing at least partially surrounding the second seal ring assembly, said seal housing having an internal contact surface, a separate free floating slip ring between the second seal ring assembly and said contact surface outboard from said elastomeric seal ring, said seal ring having a rounded nose riding on said contact surface and a radial face sliding on said seal ring of said second seal ring assembly, an O-ring in said housing sealingly surrounding said seal ring of said second seal ring assembly and accommodating tilting of the second seal ring assembly in the seal housing, said seal housing being adapted to rockably receive said slip ring, and said slip ring being adapted to slide on said seal ring to accommodate a wide range of orthogonal misalignment of the shaft with respect to the housing without being exposed to any leakage path between the first and second seal rings.

9. A seal assembly according to claim 8, further wherein seal housing comprises an internal stepped bore.

10. A seal assembly according to claim 9, further wherein said second seal ring assembly comprises a stepped outer surface corresponding to said stepped bore.

11. A seal assembly according to claim 8, further comprising an annular groove formed in said internal bore of said seal housing and surrounding said second seal ring assembly, and said elastomeric seal ring being an O-ring disposed in said groove and in sealing engagement with said second seal ring assembly.

12. A seal assembly according to claim 11, further comprising a gasket disposed between said housing and said seal housing and providing a fluid-tight seal therebetween.

13. A seal assembly according to claim 8, further comprising anti-rotation means for securing said second seal ring assembly against rotation within said seal housing.

14. A seal assembly according to claim 13, further wherein said anti-rotation means comprises a plurality of recesses formed in an outer surface of said second seal ring assembly, and a plurality of anti-rotation lugs, each of said lugs extending through said seal housing and into a respective one of said recesses in said second seal ring assembly.

15. In a device including a rotary shaft extending from an opening in a stationary housing, a shaft seal assembly comprising the following: a rotary seal member affixed to said shaft for rotation therewith, a first O-ring sealing the rotary seal member to the shaft, said rotary seal member having a seal face extending in a plane that is substantially orthogonal to a rotational axis of said shaft, a stationary member secured to said housing at a position surrounding said opening, said stationary member including a stepped internal bore having a tapered contact surface, an annular, stationary member disposed in said internal bore of said stationary member, said floating member including a hardened end face at a first end thereof in sealing contact with said seal face of said rotary seal member, and further including an annular rear face at a second end thereof, a free floating annular slip ring surrounding said shaft, said slip ring having a sliding face abutting said rear face of said floating member, and a part-spherical contact face abutting said contact surface of said stationary member, and a second O-ring sealing the stationary member to the housing inboard from said slip ring, whereby said slip ring permits non-orthogonal alignment between said shaft and said housing while maintaining said hardened end face and said seal face in sealing engagement with one another and substantially orthogonal to said rotational axis without being subject to any leakage path across the contacting seal faces.

16. A seal assembly according to claim 15, further wherein said floating member comprises a stepped outer surface corresponding to said stepped internal bore.

17. A seal assembly according to claim 15, further comprising an annular groove formed in said stepped internal bore and surrounding said floating member, and said second O-ring being disposed in said groove and in sealing engagement with said floating member.

18. A seal assembly according to claim 17, further comprising a gasket disposed between said housing and said stationary member and providing a fluid-tight seal therebetween.

19. A seal assembly according to claim 15, further comprising anti-rotation means for securing said floating member against rotation within said stationary member.

20. A seal assembly according to claim 19, further wherein said anti-rotation means comprises a plurality of recesses formed in an outer surface of said floating member, and a plurality of anti-rotation lugs, each of said lugs extending through said stationary member and into a respective one of said recesses in said floating member.

* * * * *